Dec. 28, 1926.

A. M. DUFFIE 1,612,270

DOMESTIC BOILER SYSTEM

Filed June 5, 1923    2 Sheets-Sheet 1

Inventor
Allen M. Duffie.
by Popp and Powers
Attorneys.

Dec. 28, 1926.  1,612,270

A. M. DUFFIE

DOMESTIC BOILER SYSTEM

Filed June 5, 1923  2 Sheets-Sheet 2

Inventor
Allen M. Duffie.
by Popp and Powers.
Attorneys.

Patented Dec. 28, 1926.

1,612,270

UNITED STATES PATENT OFFICE.

ALLEN M. DUFFIE, OF BUFFALO, NEW YORK, ASSIGNOR, BY MESNE ASSIGNMENTS, TO MONARCH ELECTRIC APPLIANCE COMPANY, OF DETROIT, MICHIGAN, A CORPORATION OF MICHIGAN.

DOMESTIC BOILER SYSTEM.

Application filed June 5, 1923. Serial No. 643,561.

This invention relates to improvements in domestic boiler systems.

The principal object of the invention is to provide an electrically controlled system which will always maintain a determined amount of hot water in the boiler, and which will be operated and controlled positively and automatically by mechanism of extremely simple nature.

A further object of the invention is to provide a system wherein the amount of heated water to be maintained may be certainly regulated as desired, in accordance with the demand, thereby to promote economy in operation.

With the above objects in view, the invention consists generally in the combination of a tank for the storage of heated water, electrically controlled means for heating the water in the tank, and means under the direct control of the tank, in accordance with the expansion or contraction thereof, for automatically regulating the operation of the heating means. The invention also consists of novel details of construction and arrangement which will be set forth as the description proceeds.

An embodiment of the invention is illustrated in the accompanying drawings wherein.

Figure 1:
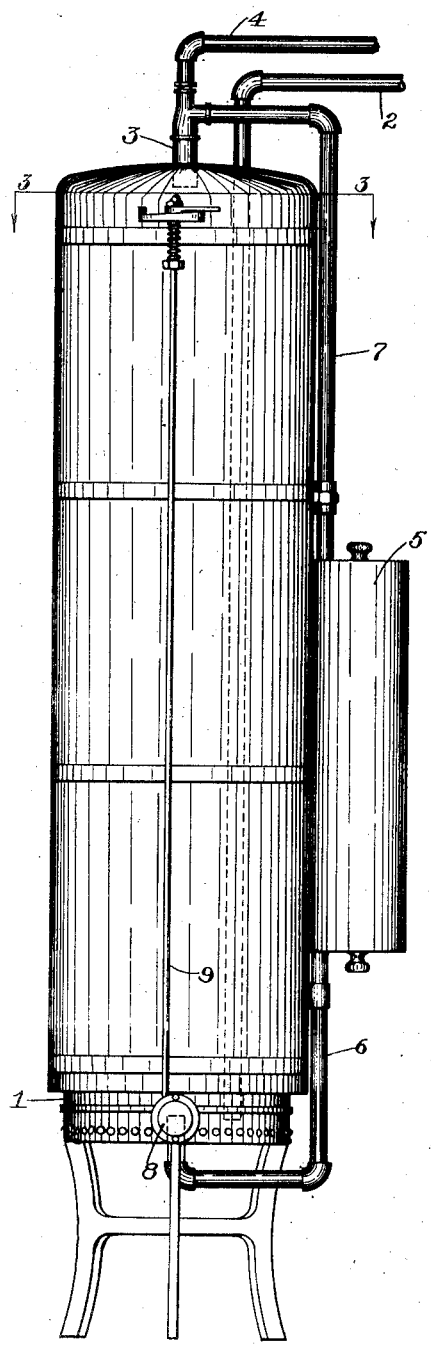
Figure 1 is an elevation of the tank, the heater and the associated parts.
Figure 2:
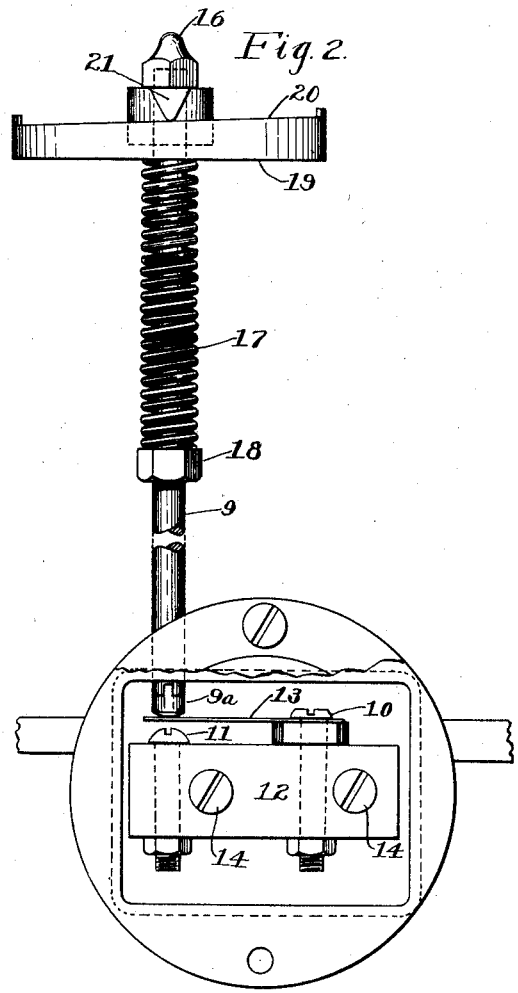
Figure 2 is a detail elevation of the regulating mechanism.
Figure 3:
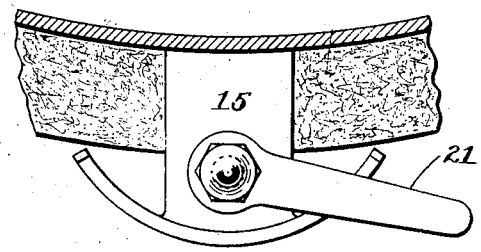
Figure 3 is a detail sectional view on the line 3—3 of Fig. 1.

The tank 1 preferably corresponds in form and arrangement to the ordinary boiler shell employed as an adjunct of a domestic furnace or range and is supplied with cold water from the service line by a pipe 2 which terminates near the bottom of said tank in the usual manner, as indicated by broken lines in Figure 1. The tank is provided at its upper end with an outlet connection 3 which is coupled to the pipe 4 by which the heated water is carried to the various taps.

The heater 5 may be of any suitable or preferred construction. It is preferably of the kind wherein an electric resistance element is employed as the heating medium. As now considered it is preferred to use a heater of the construction shown in my co-pending application Serial No. 643,560. A pipe 6 conducts water from the lower end of the tank 1 to the heater 5 and a pipe 7 conducts water from the heater 5 to the upper end of the tank 1, the pipe 7 being joined to the outlet connection 3.

The operation of the heater 5 is automatically controlled in accordance with the thermal condition of the tank 1. For this purpose a switch 8 is subject to the control of an operating element 9. The switch 8 includes the fixed contacts 10 and 11 suitably mounted on an insulating base 12 and the movable contact 13 permanently connected to the contact 10 and adapted to engage or disengage the contact 11.

One feature of the invention consists in an arrangement such that the element 9 and the fixed parts of the switch 8 are relatively movable in accordance with the expansion and contraction of the tank 1, and in and by such movements the element 9 controls the position of the movable contact 13. The switch 8 may of course be of any suitable construction or type; as shown its base 12 is anchored, as by screw fastenings 14, to the vertical wall of the tank 1 at or near the lower end thereof, and its movable contact 13 is in the form of a leaf spring which tends to disengage the contact 11 and is moved by the element 9 into engagement therewith. The form and arrangement of the element 9 is selected to provide for its co-ordination to the switch 8. In the specific construction disclosed, the element 9 consists of a rod which extends in the longitudinal, i. e., vertical, direction of the tank and is supported by said tank at or near the end thereof remote from the switch 8. At its opposite end the rod 9 engages the movable contact 13, for this purpose being provided with an insulating tip 9ᵃ and being extended through an opening in the casing of the switch 8 which thereby serves as a guide for said rod in its operative movements. The tank 1 is provided at or near its upper end with a bracket arm 15 to which the rod 9 is secured in any suitable manner whereby as the tank expands, the rod will be raised and as it contracts the rod will be lowered.

Another feature of the invention consists in provision for the adjustment of the normal relative position of the element 9 and the movable contact 13 whereby the amount of heated water to be normally maintained in the tank 1 can be regulated as desired. In the construction shown and preferred, the arm 15 has an aperture through which the rod 9 loosely extends and said rod is provided above said arm with a securing nut 16 and below said arm with a helical expansive spring 17 which bears against the under face of said arm and against a nut 18 on the rod, the nut 18 being available to adjust the tension of said spring; the arm 15 is provided with an extension 19 which is preferably of curved form and has its upper face 20 formed along an incline, thereby to serve as a cam, and the rod 9 is provided with an adjusting handle 21 which bears upon the cam face 20 and is arranged between the nut 16 and the arm 15; the engagement of the handle 21 with the cam face 20 being maintained by the spring 17. It will be apparent that by moving the handle 21 along the cam face 20, the rod 9 will be raised or lowered according to the direction in which the handle is moved. The higher the position of the rod, as effected by the handle 21, the lower will be the amount of heated water which can be stored in the tank. This will be apparent when it is considered that the higher the position in which the rod is initially set the greater will be the extent of tank contraction required, by means of said rod, to close the switch 8. As shown, the cam face 20 inclines downward from right to left and consequently, a movement of the handle 21 to the left will lower the rod 9 and provide for an increase of the amount of heated water to be stored in the tank and a movement of the handle 21 to the right will raise the rod 9 and provide for a decrease in the amount of heated water to be stored in the tank. With reference to the drawings, it may be assumed that the extreme right hand position of the handle 21 will provide for the use of but one-fourth of the capacity of the tank for the storage of heated water, that the middle position of said handle will provide for the use of half the capacity of the tank and that the extreme left hand position of said handle will provide for the use of three-fourths of the capacity of the tank.

Figure 4:
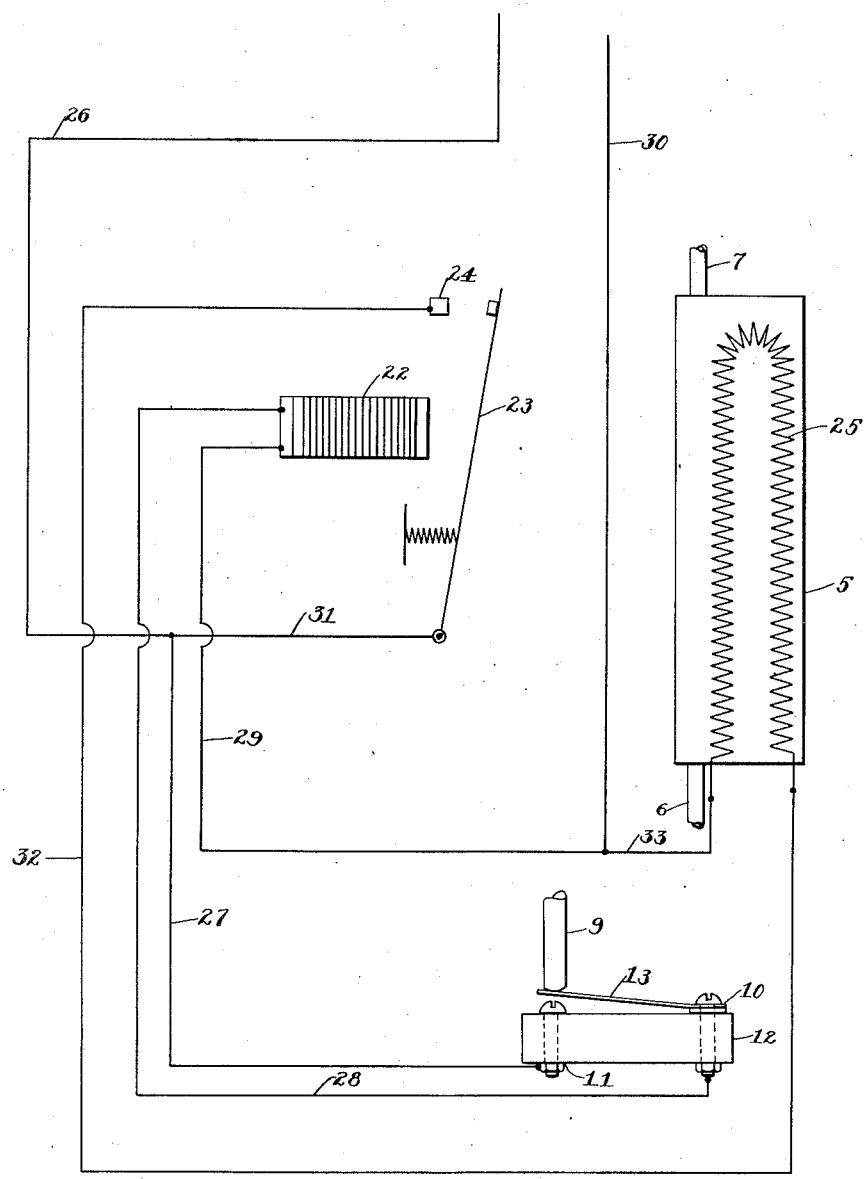
Figure 4 is a diagram of the wiring of the system.

Any suitable electrical system may be provided for the operation of the heater 5, the system shown diagrammatically in Figure 4 being an example. In this system the switch 8 is used to energize or de-energize the holding magnet 22 of a magnetic switch or contactor of any known or suitable construction whereof the armature 23, operating as a switch arm of the clapper type, by engagement with a carbon contact 24 closes the circuit of the heating element 25. Assuming the switch 8 to be closed, the circuit of the magnet 22 may be traced as follows: Line wire 26, wire 27, contacts 11, 13 and 10 of switch 8, wire 28, magnet 22, wire 29, and line wire 30. The magnet 22, thus energized by means of the circuit described, attracts its armature 23 to close the circuit of the heating element 25 and this latter circuit may be traced as follows: Line wire 26, wire 31, armature 23, contact 24, wire 32, heating element 25, wire 33, and line wire 30.

The heating element 25 is thus energized so long as the switch 8 remains closed and during this period heated water is delivered from the heater 5 into the upper portion of the tank, the local circulation through the tank and the heater being the same as with any ordinary gas heater. As the heated water is supplied to the tank, the latter gradually expands and during the first period of such expansion, the arm 15 moves along the rod 9 and the rod, by the action of the spring 17, maintains the engagement of the contacts 13 and 11 with resultant continuance of the operation of the heater. As the expansion of the tank continues a point is reached, coincidently with the normal amount of heated water having been supplied to the tank, at which the arm 15 engages the handle 21 with lifting effect and the result of such engagement is the raising of the rod 9 and the breaking of the circuit of the magnet 22 at the switch 8. When the magnet is thus de-energized, its armature 23 disengages the contact 24, thus breaking the circuit of the heating element 25 and interrupting the operation of the heater. When, for any reason, the supply of heated water in the tank is diminished, as by the use of the water at the service taps, or by the normal loss of heat, the tank contracts and lowers the rod 9 to which downward movement is transmitted by the arm 15, acting through the spring 17 and nut 18, a point being ultimately reached at which said rod effects the engagement of the contact 13 with the contact 11. Thereupon the circuit of the magnet 22 is closed through the switch 8 and the circuit of the heating element is closed through the armature 23 and contact 24 and the operations above described are repeated. In this way, a constant supply of hot water is automatically maintained in a quantity sufficient for all usual domestic purposes.

It will be understood that various structural modifications may be resorted to within the scope of the invention as defined by the appended claims and that the description of specific details of the embodiment disclosed is not intended to impose limitations upon the claims or to be taken otherwise than for the purpose of exposition.

Having fully described my invention, I claim:

1. In a domestic boiler system, in combination, a tank for the storage of heated water, a heater connected to the tank, an electric circuit which provides for the operation of said heater, and means for the automatic control of said circuit in accordance with the thermal condition of the tank comprising as companion co-operating parts a switch and an operating element therefor connected to the tank for movement relative to one another in accordance with the contraction or expansion of the tank.

2. In a domestic boiler system, in combination, a tank for the storage of heated water, a heater connected to the tank, an electric circuit which provides for the operation of said heater, and means for the automatic control of said circuit in accordance with the thermal condition of the tank comprising as companion co-operating parts a switch and an operating element therefor connected to the tank for movement relative to one another in accordance with the contraction or expansion of the tank and means for adjusting the normal position of one of said companion parts relatively to the other, thereby to regulate the timing of the operations of said switch with reference to the contraction or expansion of said tank.

3. In a domestic boiler system, in combination, a tank for the storage of heated water, a heater connected to the tank, an electric circuit which provides for the operation of said heater, a switch for the control of said circuit, and an element movable with said tank in accordance with the contraction or expansion thereof for controlling said switch.

4. In a domestic boiler system, in combination, a tank for the storage of heated water, a heater connected to the tank, an electric circuit which provides for the operation of said heater, a switch secured to the tank for the control of said circuit, and a rod secured to and movable with the tank in accordance with the contraction or expansion thereof for controlling said switch.

5. In a domestic boiler system, in combination, a tank for the storage of heated water, a heater connected to the tank, an electric circuit which provides for the operation of said heater, a switch secured to the tank for the control of said circuit, a rod secured to and movable with the tank in accordance with the contraction and expansion thereof for controlling said switch, and means for adjustably varying the normal position of the rod relatively to the switch.

6. In a domestic boiler system, in combination, a tank for the storage of heated water, a heater connected to the tank, an electric circuit which provides for the operation of said heater, a switch secured to the tank for the control of said circuit and a spring pressed rod yieldably mounted on and movable with the tank in accordance with the contraction and expansion thereof for controlling said switch.

7. In a domestic boiler system, in combination, a tank for the storage of heated water, a heater connected to the tank, an electric circuit which provides for the operation of said heater, a switch secured to the tank for the control of said circuit, a rod movable with the tank in accordance with the contraction and expansion thereof for controlling said switch, an arm secured to the tank and having an aperture through which the rod loosely extends, an extension on said arm having its upper face inclined from one end to the other, thereby to serve as a cam, a handle secured on said rod and engaging said cam, the handle being operated along said cam to raise or lower said rod and thereby adjust its normal position relative to said switch and a spring mounted on said rod and bearing on the under side of said arm to press the rod toward said switch.

In testimony whereof I affix my signature.

ALLEN M. DUFFIE.